2,985,657

1-(AROYLALKYL)-4-HETEROCYCLYLPIPERAZINES

Paul A. J. Janssen, Antwerpse Steenweg 16,
Vosselaar near Turnhout, Belgium

No Drawing. Filed Oct. 12, 1959, Ser. No. 845,630
7 Claims. (Cl. 260—256.4)

The present invention relates to a new group of heterocyclic piperazine derivatives and more particularly to 1-(aroylalkyl)-4-heterocyclylpiperazines where the heterocycle is one containing two atoms of nitrogen of the general structural formula

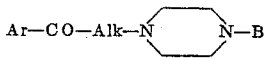

wherein Alk is a lower alkylene radical, Ar is a member of the class consisting of phenyl, tolyl, halophenyl, methoxyphenyl, and thienyl radicals; and B is a member of the class consisting of pyrimidyl, methylpyrimidyl, dimethylpyrimidyl, methylthiopyridazinyl, chloropyridazinyl, and methoxypyridazinyl radicals.

The radical Alk in the foregoing formula is a bivalent saturated hydrocarbon radical, preferably one containing 2 to 4 carbon atoms such as ethylene, trimethylene, propylene, tetramethylene and butylene.

The compounds of the invention can be advantageously prepared by the condensation of a compound of the structural formula Ar—CO—Alk—Halogen with an appropriately selected compound of the structural formula

where Ar, Alk, and B are defined as above. The condensation can be carried out in an inert solvent such as an aromatic hydrocarbon (e.g. benzene, toluene, xylene), a lower alkanol (e.g. ethanol, propanol, butanol), or in a lower alkanone (e.g. acetone, butanone, pentanone). In certain cases the reaction can be usefully accelerated by the use of elevated temperatures.

An alternate procedure employs the condensation of 1-aroylalkylpiperazine of the formula

with an appropriately selected compound of the structural formula

Halogen—B wherein Ar, Alk and B are defined as above.

The compounds also can be prepared by reacting a haloalkanonitrile of the formula NC—Alk—Halogen with a compound of the structural formula

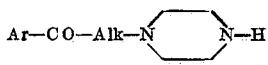

wherein Alk and B are defined as above. The 1-piperazinealkanonitrile of the formula

thus obtained is heated with an arylmagnesium halide of the formula

Ar—Mg—Halogen under Grignard conditions, followed by acid hydrolysis of the adduct; Ar, Alk, and B are defined as above.

Another method for the preparation of the compounds of this invention employs the acid hydrolysis of the appropriate 4 - heterocyclyl - 1 - piperazinealkanonitrile to form the acid which is then converted to the acyl halide of the structural formula

A Friedel-Crafts reaction using the appropriate aromatic hydrocarbon, ArH, results in the formation of the product.

In still another procedure for the preparation of the compounds of this invention an amine of the formula

BNH$_2$ is heated with a compound of the formula

Ar—CO—Alk—N(CH$_2$CH$_2$X)$_2$ where Ar, Alk, and B are defined as above and X is a strong electronegative group such as halo, arylsulfonoxy, alkylsulfonoxy, and especially a chloro, bromo, or 4-toluenesulfonoxy group.

The compounds of this invention are depressants of the central nervous system, anticonvulsants, hypnotics, barbiturate potentiators, and analgesics. Unlike the corresponding compounds in which the pyrimidine or pyridazine moiety is replaced by a pyridine group, the heterocyclylpiperazines of this invention are also antidiuretics.

The organic bases of this invention form pharmaceutically useful non-toxic salts with a variety of inorganic and strong organic acids including sulfuric, phosphoric, hydrochloric, hydrobromic, hydroiodic, sulfamic, citric, lactic, maleic, malic, succinic, tartaric, cinnamic, acetic, benzoic, gluconic, ascorbic, and related acids. They also form quaternary ammonium salts with a variety of organic esters of sulfuric, hydrohalic and aromatic acids. Among such esters are methyl chloride and bromide, ethyl chloride, propyl chloride, butylchloride, isobutyl chloride, benzyl chloride and bromide, phenethyl bromide, naphthylmethyl chloride, dimethylsulfate, diethylsulfate, methyl benzenesulfonate, ethyl toluenesulfonate, ethylene chlorohydrin, propylene chlorohydrin, allyl bromide, methallyl bromide and crotyl bromide.

The compounds which constitute this invention and the methods for their preparation will appear more fully from a consideration of the following examples, which are given for the purpose of illustration only and are not to be construed as limiting the invention in spirit or in scope. In these examples quantities are indicated as parts by weight.

Example 1

A solution of 71 parts of γ-chlorobutyryl chloride and 63 parts of benzene are added with stirring and cooling to a suspension of 71 parts of aluminum chloride in 310 parts of benzene. After the addition is completed, the cooling bath is removed, and the stirring is continued for 30 minutes. The reaction mixture is poured into ice water. The benzene layer is separated, dried over anhydrous sodium sulfate, and filtered. The filtrate is concentrated under reduced pressure to remove the benzene and the residue is distilled to yield γ-chlorobutyrophenone boiling at about 134–137° C. at 5 mm. pressure.

Using equimolar amounts of toluene in place of the benzene in the preceding paragraph of this example yields γ-chloro-4-methylbutyrophenone boiling at about 100–110° C. at 4 mm. pressure.

By substituting δ-chlorovaleryl chloride for the γ-chlorobutyryl chloride in the experiment of the first paragraph of this example, δ-chlorovalerophenone is obtained.

Example 2

To a suspension of 341 parts of aluminum chloride in 1740 parts of carbon disulfide are added 96 parts of fluorobenzene with stirring and cooling. While the temperature is maintained at about 10° C., 141 parts of γ-chlorobutyryl chloride are added. After the addition is completed, the cooling bath is removed and the stirring is continued for 2 hours. The mixture is poured into ice water. The organic layer is separated, washed with water, dried over anhydrous sodium sulfate, and filtered. The filtrate is concentrated under reduced pressure, and the resulting residue is distilled to yield γ-chloro-4-fluorobutyrophenone boiling at about 136–142° C. at 6 mm. pressure.

Using equivalent amounts of methoxybenzene for fluorobenzene in the first paragraph of this example will yield γ-chloro-4-methoxybutyrophenone boiling at 175° C. at a pressure of 6 mm. Using an equivalent amount of iodobenzene for fluorobenzene in the first paragraph yields γ-chloro-4-iodobutyrophenone.

Example 3

A mixture of 84 parts of anhydrous thiophene, 141 parts of γ-chlorobutyryl chloride and 870 parts of anhydrous benzene is cooled to 0 to −5° C. While this temperature is maintained, 260 parts of stannic chloride are added slowly over a 2 hour period. After the addition is complete, the cooling bath is removed and the stirring is continued for about 1 hour. The mixture is then poured into a mixture of 60 parts of concentrated hydrochloric acid and 450 parts of ice water. The organic layer is separated, washed with water, dried over anhydrous calcium chloride and filtered. The filtrate is concentrated under reduced pressure and then distilled to yield 2-(γ-chlorobutyryl)thiophene boiling at 144–146° C. at 11 mm. of pressure.

Example 4

A mixture of 45 parts of 2-chloro-4-methylpyrimidine and 77.5 parts of anhydrous piperazine in ethanol is refluxed for 1 hour. The solvent is then evaporated to leave a solid residue which is dissolved in water. The aqueous solution is extracted with chloroform. The organic layer is dried over anhydrous sodium sulfate and filtered. After evaporation, the residue is distilled under vacuum to yield 1-(3-methyl-2-pyrimidyl)piperazine boiling at about 170° C. at 20 mm. This compound solidifies to a white solid melting at about 27° C.

Example 5

A mixture of 51 parts of 2-chloro-4,6-dimethylpyrimidine, 70 parts of piperazine in 200 parts of ethanol is refluxed for 30 minutes and then made alkaline with ammonium hydroxide. The solvent is evaporated under vacuum and the residue is dissolved in water. The aqueous solution is extracted with chloroform. The extract is dried over sodium sulfate. Upon evaporation, 1-(4,6-dimethyl-2-pyrimidyl)piperazine is obtained melting at about 75.6–78° C. It boils at about 165–172° C. at 15–16 mm. pressure.

Example 6

A mixture of 5.45 parts of γ-chlorobutyrophenone and 9.9 parts of 1-(2-pyrimidyl)piperazine is heated at 110° C. for 5 hours. After cooling, the mixture is treated with water and ether and the layers are separated. The water layer is extracted with ether. The ether layers are combined, dried over sodium sulfate, and filtered. The filtrate is cooled at −20° C. to yield 1-(γ-benzoylpropyl)-4-(2-pyrimidyl)piperazine. The pale yellow powder of this compound melts at about 78–79° C. It has the structural formula

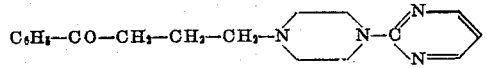

By substituting an equimolar amount of γ-chloro-4-methylbutyrophenone for γ-chlorobutyrophenone in the first paragraph of this example, 1-[γ-(4-methylbenzoyl)-propyl]-4-(2-pyrimidyl)piperazine is obtained.

By equimolar substitution of β-chloropropiophenone for γ-chlorobutyrophenone in the first paragraph of this example, 1-(β-benzoylethyl)-4-(2-pyrimidyl)piperazine is obtained.

By equimolar substitution of δ-chlorovalerophenone for γ-chlorobutryophenone in the first paragraph of this example, 1-(δ-benzoylbutyl)-4-(2-pyrimidyl)piperazine is obtained. The compound has the formula

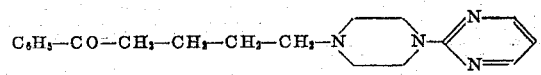

Example 7

A mixture of 5.45 parts of γ-chlorobutyrophenone and 10.7 parts of 1-(4-methyl-2-pyrimidyl)piperazine is heated at 105° C. for 5 hours and cooled. The mixture is treated with water and ether. The ether layer is separated, dried over sodium sulfate, and filtered. After cooling at −20° C. the precipitate formed is filtered and dried to yield 1-(γ-benzoylpropyl)-4-(4-methyl-2-pyrimidyl)piperazine melting at about 62.4–63.2° C.

Example 8

A mixture of 4.55 parts of γ-chlorobutyrophenone and 8.9 parts of 1-(4,6-dimethyl-2-pyrimidyl)piperazine is heated at 110° C. for 5 hours. The mixture is then dissolved in water and ether and the layers are separated. The organic layer is dried over sodium sulfate and filtered. After chilling at −20° C. a precipitate is obtained which is recrystallized from diisopropyl ether to yield 1-(γ-benzoylpropyl) - 4 - (4,6 - dimethyl - 2 - pyrimidyl)-piperazine. The pale brown needles melt at about 97.4–98° C. The compound has the formula

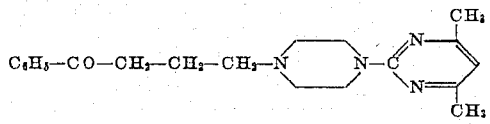

Example 9

A mixture of 6.2 parts of γ-chloro-4-fluorobutyrophenone and 10.7 parts of 1-(4-methyl-2-pyrimidyl)-piperazine is heated at 110° C. for 5 hours and cooled. The mixture is treated with water and ether and the layers are separated. The ethereal solution is dried over sodium sulfate. After cooling to −20° C., the precipitate formed is filtered and dissolved in ether. Hydrogen chloride gas is passed through the solution. The resulting precipitate is recrystallized from 2-propanol and ethanol to yield 1-[γ - (4 - fluorobenzoyl)propyl] - 4 - (4 - methyl - 2 - pyrimidyl)piperazine dihydrochloride. The pale yellow powder of this compound melts at about 215–220° C.

By substituting an equimolar amount of δ-chloro-4-iodobutyrophenone for γ-chloro-4-fluorobutyrophenone in the first paragraph of this example, 1-[γ-(4-iodobenzoyl)-propyl]-4-(4-methyl-2-pyrimidyl)piperazine dihydrochloride is obtained. It has the structural formula

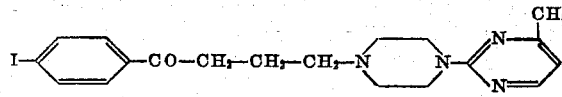

Example 10

A mixture of 5 parts of γ-chloro-4-fluorobutyrophenone and 8.9 parts of 1-(4,6-dimethyl-2-pyrimidyl)piperazine is heated on a water bath at 100° C. for 5 hours. The mixture is treated with 100 parts of water and 160 parts of ether. The ether layer is separated and dried over sodium sulfate, filtered, and evaporated. The residue is crystallized from diisopropyl ether to yield 1-[γ-(4-fluorobenzoyl-propyl] - 4 - (4,6 - dimethyl - 2 - pyrimidyl)piperazine. The microcrystalline powder of this compound melts at about 85.5–87.5° C.

Example 11

A mixture of 7.4 parts of γ-chloro-4-methoxy-butyrophenone and 9.9 parts of 1-(2-pyrimidyl)piperazine is heated on a water bath at 100° C. for 4 hours. The mixture is treated with benzene and water and the layers are separated. The water layer is extracted with benzene. The combined benzene solutions are dried over sodium sulfate, filtered, treated with activated charcoal, and filtered again. The filtrate is evaporated. The residue is dissolved in diisopropyl ether and the solution is filtered to remove the insoluble material. The filtrate is cooled at a low temperature. The precipitate which forms is recrystallized from diisopropyl ether. After drying under vacuum, the microcrystalline powder of 1-[γ-(4-methoxybenzoyl)propyl]-4-(2-pyrimidyl)piperazine melts at about 83–83.5° C.

Example 12

A mixture of 7.4 parts of γ-chloro-4-methoxybutyrophenone and 10.7 parts of 1-(4-methyl-2-pyrimidyl)piperazine is heated for 5 hours at 105° C. and then cooled. The mixture is treated with water and ether. The ether layer is separated and dried over anhydrous sodium sulfate and filtered. Dry hydrogen chloride gas is passed through the filtrate. After filtering and drying, the hygroscopic powder of 1-[γ-(4-methoxybenzoyl)propyl]-4-(4-methyl-2-pyrimidyl)piperazine dihydrochloride melts at about 90° C.

Example 13

A mixture of 6.2 parts of γ-chloro-4-methoxybutyrophenone and 9.6 parts of 1-(4,6-dimethyl-2-pyrimidyl)piperazine is heated on a water bath for 1 hour at 100° C. Upon cooling, the mixture is refluxed with diisopropyl ether. The mixture is filtered and the filtrate diluted with petroleum ether. The precipitate formed is filtered and dried to yield the white powder of 1-[γ-(4-methoxybenzoyl)propyl]-4-(4,6-dimethyl-2 - pyrimidyl)piperazine melting at about 71.8–74.2° C. It has the structural formula

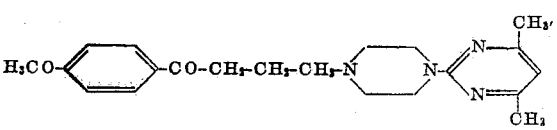

Example 14

A mixture of 6.2 parts of 2-(γ-chlorobutyryl)thiophene and 9.9 parts of 1-(2-pyrimidyl)piperazine is heated at 105° C. for 5 hours and cooled. The mixture is treated with water and ether. The ether layer is separated, dried over sodium sulfate, and filtered. Petroleum ether is added to the filtrate. After chilling at −20° C. the precipitate formed is collected and dried to yield 1-[γ-(2-thenoyl)propyl]-4-(2-pyrimidyl)piperazine. The yellow powder of this compound melts at about 57.5–58.6° C.

Example 15

A mixture of 6.2 parts of 2-(γ-chlorobutyryl)thiophene and 10.7 parts of 1-(,4-methyl-2-pyrimidyl)piperazine is heated at 105° C. for 5 hours. After cooling the mixture is treated with water and ether. The ether layer is separated and dried over sodium sulfate. After chilling at −20° C., the semi-solid precipitate formed is filtered and purified by recrystallization from diisopropyl ether to yield the brown crystals of 1-[γ-(2-thenoyl)propyl]-4-(4-methyl-2-pyrimidyl)piperazine which melt at about 52–53° C.

By passing dry hydrogen chloride gas through an ethereal solution of the base, the precipitate formed is filtered and recrystallized from 2-propanol to yield the dihydrochloride of 1-[γ-(2-thenoyl)propyl]-4-(4-methyl-2-pyrimidyl)piperazine melting at about 214.8–217° C.

Example 16

A mixture of 4.8 parts of 2-(γ-chlorobutyryl)thiophene and 8.9 parts of 1-(4,6-dimethyl-2-pyrimidyl)piperazine is heated on an oil bath at 100° C. for 10 hours and then cooled. The mixture is treated with water and benzene and the layers are separated. The aqueous layer is extracted with benzene. The combined organic layers are dried over sodium sulfate, heated with activated charcoal, and filtered. The solvent is evaporated. The residue is dissolved in a mixture of diisopropyl ether and petroleum ether. After chilling at −20° C., filtering, and drying the pale yellow powder of 1-[γ-(2-thenoyl)propyl]-4-(4,6-dimethyl-2-pyrimidyl)piperazine melting at about 64.5–65.6° C. is obtained. The compound has the structural formula

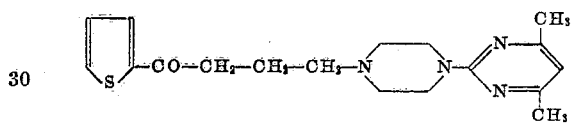

Example 17

A mixture of 6.2 parts of γ-chloro-4-fluorobutyrophenone and 9.9 parts of 1-(2-pyrimidyl)piperazine is heated at 105° C. for 5 hours. After cooling, the mixture is treated with water, ether, and toluene. The organic layer is separated, dried over anhydrous sodium sulfate, and filtered. After cooling at −20° C., the crude 1-[γ-(4-fluorobenzoyl)propyl] - 4 - (2 - pyrimidyl)piperazine is filtered and recrystallized from diisopropyl ether to yield a pale yellow powder melting at about 111.6–112.8° C. An additional yield of the product is obtained by concentrating and cooling the mother liquor.

Example 18

To a solution of 35 parts of piperazine and 60 parts of benzene are added 7.5 parts of 3,6-dichloropyridazine. The mixture is refluxed for 2 hours, cooled, made alkaline and extracted with 160 parts of chloroform. The chloroform layer is dried and evaporated. The remaining residue is recrystallized from boiling petroleum ether to yield the white amorphous powder of 1-(6-chloro-3-pyridazine)piperazine melting at about 100–101.8° C.

A solution of 10 parts of 1-(6-chloro-3-pyridazine)-piperazine dihydrochloride in 160 parts of 2-propanol is hydrogenated under atmospheric pressure with 3 parts of a 5% palladium-on-charcoal catalyst. After absorption of one molecular equivalent of hydrogen, the hydrogenation is stopped and sodium hydroxide is added. The solution is evaporated. The residue is extracted with chloroform, and the extract is evaporated. This residue is dissolved in benzene and filtered to remove impurities. Hydrogen chloride gas is then passed through the filtrate. The precipitate formed is filtered and dissolved in hot 2-propanol to yield crude 1-(3-pyridazine)piperazine dihydrochloride. After trituration with 40 parts of methanol, filtering, and drying, the yellowish, amorphous powder of this compound melts at about 275–278.8° C.

Example 19

To an agitated refluxing solution of 69 parts of piperazine and 160 parts of anhydrous toluene are added with stirring a solution of 36.4 parts of γ-chlorobutyrophenone and 40 parts of anhydrous toluene during the course of one hour. After the addition is completed, the refluxing and agitation is continued for 2 hours. The mixture is cooled and filtered. The filtrate is evaporated and the residue is fractionated under vacuum to yield 1-(γ-benzoylpropyl)piperazine boiling at about 179.5–180° C. at 2 mm. pressure.

*Example 20*

A mixture of 14.8 parts of 1-(γ-benzoylpropyl)piperazine, 5 parts of 3-chloro-6-methylthiopyridazine, 120 parts of toluene, and 0.01 part of potassium iodide is heated in a sealed tube for 48 hours at 140–150° C. After cooling, 100 parts of water are added and the organic layer is separated. This organic layer is washed twice with 5 parts of water, dried over magnesium sulfate, filtered, and chilled at −20° C. to yield a precipitate which is collected and dried. The yellow granular powder of 1-(γ-benzoylpropyl)-4-(6-thiomethyl-3-pyridazine)piperazine melts at about 124–125° C. The compound has the structural formula

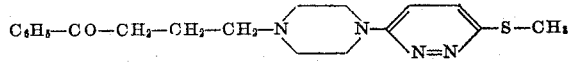

*Example 21*

A mixture of 7 parts of γ-chloro-4-fluorobutyrophenone, 14 parts of 1-(6-chloro-3-pyridazine)piperazine, 120 parts of anhydrous toluene, and 0.01 part of potassium iodide is heated in a sealed tube for 2 days at about 150° C. After cooling, the precipitate is filtered, washed with water, and combined with the filtrate. The mixture is then evaporated to dryness and the residue dissolved in 80 parts of butanol. After boiling with activated charcoal, filtering, and cooling to room temperature, the precipitate formed is filtered and dried to yield the amorphous powder of 1-[γ-(4-fluorobenzoyl)propyl]-4-(6-chloro-3-pyridazine)piperazine melting at about 152–153.9° C. The compound has the structural formula

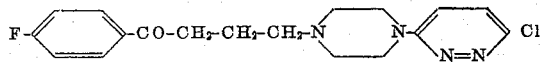

*Example 22*

A mixture of 7.4 parts of γ-chloro-4-methoxybutyrophenone, 14 parts of 1-(6-chloro-3-pyridazine)piperazine, 120 parts of toluene, and 0.01 part of potassium iodide is heated in a sealed tube for 2 days at 140–150° C. After cooling, the precipitate is filtered, washed with 100 parts of water and dissolved in 40 parts of butanone. After filtration to remove impurities, the solution is cooled at −20° C. for 24 hours to yield the shiny crystals of 1 - [γ - (4-methoxybenzoyl)propyl]-4-(6-chloro-3-pyridazine)piperazine melting at about 176–176.8° C.

*Example 23*

A mixture of 6.7 parts of 2-(γ-chlorobutyryl)thiophene, 13.8 parts of 1-(6-chloro-3-pyridazine)piperazine, 120 parts of toluene, and 0.01 part of potassium iodide is heated in a sealed tube for 48 hours at 140–150° C. After cooling, the mixture is filtered. The precipitate is washed with 150 parts of water, dissolved in butanone, decolorized with activated charcoal, and allowed to stand at room temperature to yield a precipitate. This is collected on the filter and dried to yield the pale grey granular powder of 1-[γ-(2-thenoyl)propyl]-4-(6-chloro-3-pyridazine)piperazine melting at about 138–138.8° C.

*Example 24*

A mixture of 2.5 parts of 1-[γ-(2-thenoyl)propyl]-4-(6-chloro-3-pyridazine)piperazine, 1.08 parts of sodium methoxide, 64 parts of methanol, and 0.01 part of potassium iodide is heated in a sealed tube for 48 hours at 140–150° C. After cooling, the solvent is evaporated. The residue is washed with water and dried under vacuum to yield 1-[γ-(2-thenoyl)propyl]-4-(6-methoxy-3-pyridazine)piperazine melting at about 98.8–99.8° C. The compound has the structural formula

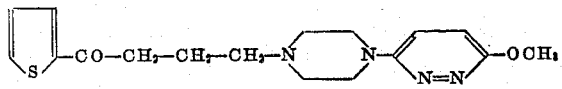

*Example 25*

A mixture of 10.5 parts of 1-(γ-benzoylpropyl)piperazine, 3.12 parts of 3,6-dichloropyridazine, and 40 parts of anhydrous benzene is refluxed for 2 hours, cooled, and filtered. The precipitate is washed with water and then triturated with ethyl acetate to yield 1-(γ-benzoylpropyl)-4-(6-chloro-3-pyridazine)piperazine melting at about 155–156° C.

What is claimed is:
1. A compound of the structural formula

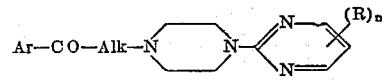

wherein Ar is a member of the class consisting of phenyl, tolyl, methoxyphenyl, halophenyl, and thienyl; Alk is a lower alkylene; R is a member of the class consisting of hydrogen and methyl; and $n$ is a positive integer smaller than 3.

2. 1-[γ-(4-fluorobenzoyl)propyl] - 4 - (2 - pyrimidyl)piperazine.

3. A compound of the structural formula

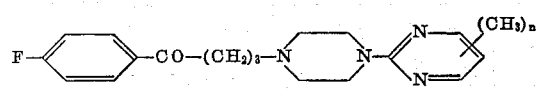

wherein $n$ is an integer of less than 3.

4. 1-[γ-(4 - fluorobenzoyl)propyl] - 4 - (4 - methyl - 2-pyrimidyl)piperazine.

5. 1-[γ-(4-fluorobenzoyl)propyl]-4-(4,6 - dimethyl - 2-pyrimidyl)piperazine.

6. 1-(γ-benzoylpropyl)-4-(2-pyrimidyl)piperazine.

7. 1-(γ-benzoylpropyl)-4-(4,6 - dimethyl-2-pyrimidyl)piperazine.

No references cited.